United States Patent [19]

Ohnishi et al.

[11] 4,293,202

[45] Oct. 6, 1981

[54] LIGHT BEAM RECORDING DEVICE

[75] Inventors: Masahiro Ohnishi; Tsutomu Kimura, both of Asaka, Japan

[73] Assignee: Fuji Photo Film Co., Ltd., Minami-ashigara, Japan

[21] Appl. No.: 85,661

[22] Filed: Oct. 17, 1979

[30] Foreign Application Priority Data

Nov. 16, 1978 [JP] Japan .................................. 53-141612

[51] Int. Cl.³ ............................................ B41B 21/08
[52] U.S. Cl. ........................................ 354/5; 346/108
[58] Field of Search ...................................... 354/5–7;
346/108, 109, 76 L; 358/285, 288, 293, 294

[56] References Cited

U.S. PATENT DOCUMENTS 4,122,462 10/1978 Hirayama et al. ...................... 354/5
4,212,018 7/1980 Ohnishi et al. ...................... 346/76 L

FOREIGN PATENT DOCUMENTS 1455779 11/1976 United Kingdom .................... 354/5

Primary Examiner—John Gonzales
Attorney, Agent, or Firm—Sughrue, Mion, Zinn, Macpeak and Seas

[57] ABSTRACT

A light beam scanning and recording device for optically reading a form slide with a raster scan, combining a signal representing the form with a data signal and recording the combined information on a recording sheet also using a raster scan. A portion of a beam scanning the form is split off and directed through an optical encoder device having an alternating transparent and opaque pattern. A detected signal from the encoder is used to detect shifts in the raster scan pattern and to consequentially properly align the data signal with the form information by controlling a clock signal synchronizing the data signal. A common optical system including vertical and horizontal beam deflectors is employed for both reading and recording beams.

7 Claims, 4 Drawing Figures

LIGHT BEAM RECORDING DEVICE

DESCRIPTION OF THE PRIOR ART

This invention relates to light beam recording devices which employ a vibrating mirror such as a galvanometer as a vertical deflector. More particularly, the invention relates to a light beam recording device in which irregularities in a recorded picture due to shifts in the deflection direction of such a vibrating mirror due to temperature variations are corrected.

For instance, a laser COM (computer output microfilm) for directly rocording computer output information on microfilm and a laser printer using an electronic picture are devices which carry out reading and recording operations by scanning with light beams. In these devices, a laser beam is employed as the light beam and the reading and recording operations are carried out by high-speed scanning with the laser beam. In general, among the light deflecting means available for scanning with a light beam at high speed, a mechanical deflecting device such as a rotary multi-mirror or a galvanometer mirror is advantageous because its optical loss is low and its deflection angle is large.

In some of the devices which use such a mechanical light deflecting means to carry out the two-dimensional scanning with a light beam, the rotary multi-mirror is used for horizontal scanning with the light beam thereby to form light beam scanning loci or scanning lines on the scanning surface while the galvanometer mirror is used for vertical scanning so that the scanning line is gradually moved to form a raster. However, temperature greatly affects the galvanometer mirror so as to change the deflection direction thereof as a result of which, for two-dimensional scanning with the light beam using the galvanometer, the scanning region is shifted vertically. This changes the positions of the scanning line so that, for example, in a device in which computer output data information is to be recorded on a form using predetermined scanning lines, the computer data information and form information are shifted with respect to one another as a result of which the recorded picture is poor in appearance.

The above-described shift in the deflection direction of the galvanometer mirror due to temperature will be referred to as "drift of the galvanometer" hereinafter when applicable.

Accordingly, an object of this invention is to provide a laser recording device in which a shift in relative position between the data and the form in a recorded picture due to drift of the galvanometer mirror is prevented.

SUMMARY OF THE INVENTION

Provided according to the invention is a light beam recording device for carrying out a recording operation on a recording material by modulating a recording light beam in which a reading light beam and a recording light beam are deflected by one and the same two-dimensional optical deflection system. A form is subjected to raster scanning with a part of the reading light beam to provide a form signal while a linear encoder is subjected to raster scanning with another part of the recording light beam to provide a video clock signal. The recording material is subjected to raster scanning with a video signal which is obtained by combining a data signal and the form signal by means of the video clock signal. The device, according to the invention, includes means for detecting drift in vertical deflection means in the two-dimensional optical deflection system by vertically scanning the linear encoder. The timing of generation of the data signal is corrected in accordance with the amount of drift thus detected.

DESCRIPTION OF THE PREFERRED EMBODIMENTS

Figure 1:
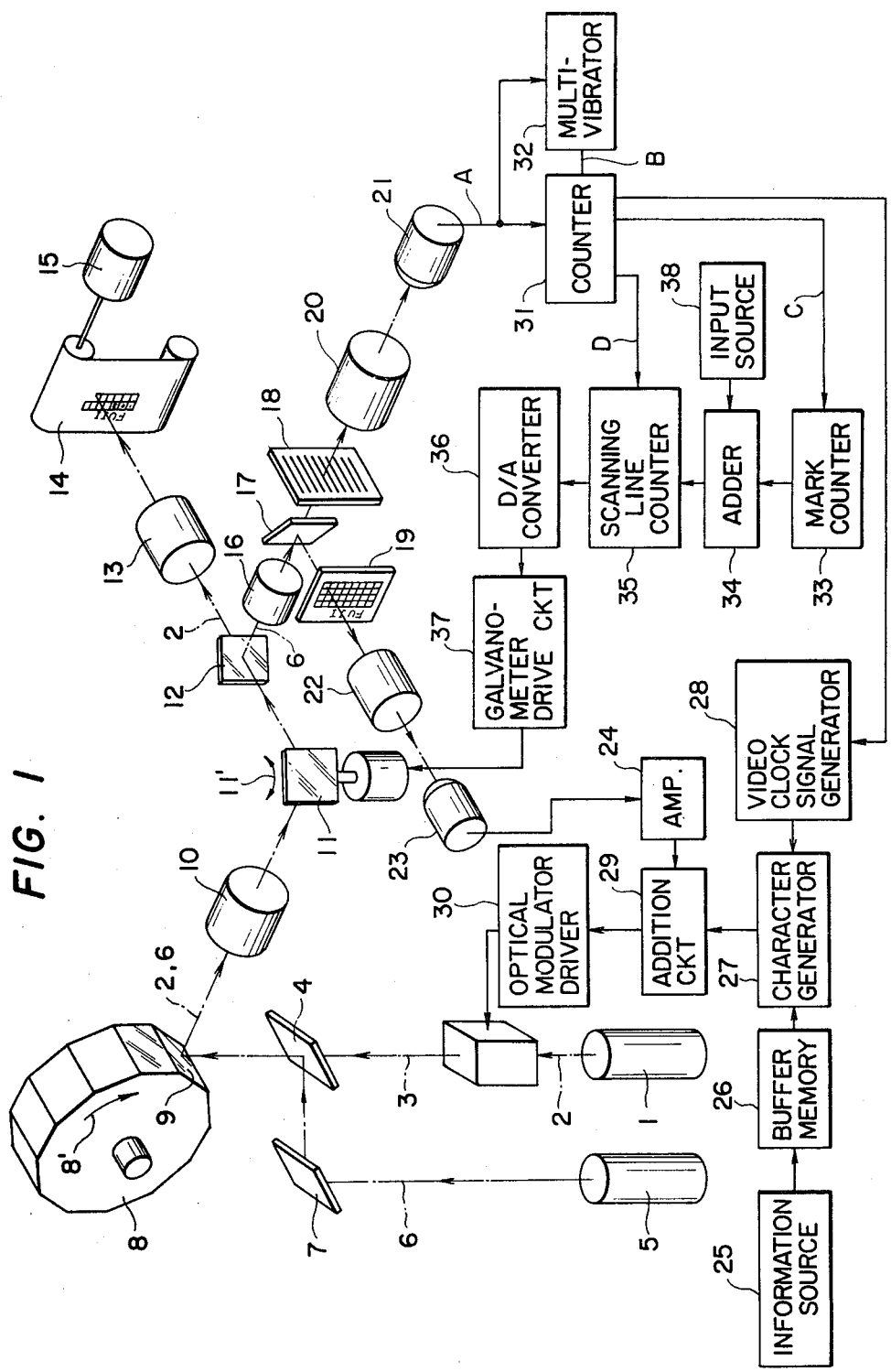
FIG. 1 is partially a perspective view and partially a block diagram showing an optical system and an electrical system of a preferred embodiment of a laser recording device according to the invention.

This invention will be described with reference to the embodiment shown in the accompanying drawings. FIG. 1 is partially a perspective view and partially a block diagram of an optical system and electrical system of a light beam recording device according to the invention. In FIG. 1, the dotted chain lines with arrows indicate the path of a light beam, the solid lines with arrows indicate the flow of an electrical signal, and the curved line with an arrow indicates the direction of rotation of a reflecting mirror.

In the optical system of the light beam recording device, a recording laser beam for scanning a recording material and a reading laser beam for scanning a form and a linear encoder are combined for two-dimensional deflection after which they are separated from each other to scan the recording material, the form and the linear encoder, respectively.

First, the optical system will be described. A laser beam source 1 is, for instance, an argon ion laser beam source which emits a blue or green laser beam. The laser beam source 1 produces a recording laser beam 2. The recording laser beam 2, after being subjected to intensity modulation with a video signal by an optical modulator, passes through a dichroic mirror 4. Another laser beam source 5 is, for example, a helium neon laser beam source which emits a red laser beam which forms a reading laser beam 6. The reading laser beam 6 is reflected by a mirror 7 and is then reflected by the dichroic mirror 4. The reading laser beam 6 thus reflected is combined with the recording laser beam 2 which passes through the dichroic mirror 4 and they advance along the same optical path.

The dichroic mirror 4 allows a blue or green light beam to pass but reflects a red light beam. The combined light beams 2 and 6 are applied to reflecting surfaces 9 of a rotary multi-mirror 8 which is rotated in the direction of the arrow 8' at a constant speed. After being deflected by the reflecting surfaces 9 (hereinafter this deflection being referred to as "horizontal deflection" when applicable) the combined laser beams 2 and 6 are applied to a galvanometer mirror 11 through a first focussing optical system 10. The galvanometer mirror 11 vibrates in the direction of the arrow 11' driven by a saw tooth waveform signal, as will be described, so that the combined laser beams 2 and 6 are deflected in a direction perpendicular to the direction of the horizontal deflection (hereinafter this deflection being referred to as "vertical deflection" when applicable). For each time the combined laser beams 2 and 6 are subjected to a horizontal deflection by a reflecting surface 9 of the rotary multi-mirror 8, the beams are subjected to vertical deflection of one unit, whereby the finally separated laser beams 2 and 6 two-dimensionally scan a scanning surface such as a recording material's surface with scanning lines (hereinafter this scanning being referred to as "raster scanning" when applicable).

The combined laser beams 2 and 6 deflected by the galvanometer mirror 11 are separated from each other by means of a second dichroic mirror 12. The recording laser beam 2 passes through the second dichroic mirror 12 and is then focussed by a second focussing optical system 13 into a small optical spot which raster scans a recording material 14. After one picture (hereinafter referred to as "one frame" when applicable) has been recorded by one raster scanning operation, the recording material 14 is moved by a drive device 15. The drive device 15 is suitably selected depending on the configuration of the recording material 14 or the recording mode chosen, for instance, whether frame recording is effected in one continuous line as in a roll, or two-dimensionally as in a matrix.

The reading laser beam 6 is reflected by the dichroic mirror 12 and is then focussed by a third focussing optical system 16. One part of the laser beam 6 thus treated passes through a half-silvered mirror 17 as a result of which a linear encoder 18 is subjected to raster scanning with the small optical spot. The other part of the laser beam 6 is reflected by the half-silvered mirror 17 and is then applied to a form slide 19 on which a form printed with lines, characters, etc. is provided. The form slide 19 is thus raster scanned with the small optical spot.

The linear encoder 18 includes a flat frame in which a number of transparent and opaque member elongated in the direction of vertical deflection are arranged alternately at predetermined intervals in the form of stripes. The reading laser beam raster scanning the linear encoder 18 passes through the transparent members of the linear encoder 18 but cannot pass through the opaque parts. Therefore, when the laser beam passing through the linear encoder 18 is applied to an optical detector 21 through a fourth focussing optical system 20, the optical detector 21 produces a photo-electric pulsed signal A during the scanning period.

The reading laser beam which raster scans the form slide 19 passes through a portion of the form slide 19 where no form picture is provided but cannot pass through portions thereof where there lies an opaque portion of the form picture. Therefore, when the laser beam passing through the form slide 19 is applied to an optical detector 23 through a fifth focussing optical system 22, the optical detector 23 produces an on-off signal corresponding to the form picture.

Next, the electrical system will be described.

Characters information or the like to be recorded (hereinafter referred to merely as "data" when applicable) is stored as a code signal in an information source 25 such as a computer or a magnetic tape. After being transferred to a buffer memory 26, the code signal is coupled to a character generator 27 at a speed different from the speed at which was written into the buffer memory 26. The character generator 27 generates a data video signal in accordance with a video clock signal from a video clock signal generating circuit 28. The data video signal, after being combined with a form video signal to be described by means of an addition circuit 29, is amplified by an optical modulator driver 30 from which it is applied to the optical modulator 3. Thus, the recording laser beam 2 is subjected to on-off modulation by the optical modulator 3 with the aid of the video signal which is synthesized in correspondence to the data information and the form information. The recording laser beam 2 thus subjected to optical modulation records a dot at a correct position on the recording material 14 and the assembly of such record dots constitutes the assembled data and form. The form video signal is produced after the on-off signal corresponding to the form picture generated by the aforementioned optical detector 23 is applied to the amplifier 24.

The video clock signal is used for timing the video signal so that dots are produced at equal intervals in a predetermined range for each scanning line. For this purpose, the above-described photo-electric pulse signal A is employed which is generated by the linear encoder in which the transmission regions are arranged at the predetermined intervals or in the form of a stripe pattern. That is, by counting the photo-electric pulse signals A, the scanning position of the laser beam can be detected. If the video clock signal is generated by utilizing the photo-electric pulse signal A, then the video signals can be provided at predetermined intervals for the recording material 14 even if the rotation of the rotary multi-mirror 8 fluctuates or the reflecting surfaces of the rotary multi-mirror 8 have angular division errors. In order to apply the photo-electric pulse signal A to the video clock signal generating device 28 to provide the video clock signal as described, the technique described in the specification of U.S. patent application Ser. No. 3,347 filed Jan. 15, 1979, now U.S. Pat. No. 4,212,018, can be employed.

The driving of the galvanometer mirror 11 will now be described. The deflection direction of the galvanometer mirror 11 is determined from a count value of a scanning line counter 35. The count value is converted into an analog signal by a digital-to-analog converter 36. The analog signal is applied to a galvanometer drive circuit 37 so as to deflect the galvanometer mirror 11. In the case when the content of the scanning line counter 35 is zero, the deflection direction of the galvanometer mirror 11 is set so as to form the uppermost scanning line in the raster scanning. As the count value of the scanning line counter 35 increases with the aid of "a galva-up" signal D as will be described below, the galvanometer mirror 11 is turned in proportion to the count value to deflect the scanning line vertically. The galvanometer mirror 11 continues to carry out the vertical deflection in this manner. When one frame of the raster scanning has been completed, the scanning line counter 35 is reset and preparations for the raster scanning of the next frame are effected.

In order to carry out recording at high speeds, it is not always necessary to start the vertical scanning after the scanning line counter 35 has been reset. That is, the vertical scanning can be started at the position of a scanning line which corresponds to the form video signal or data video signal.

In order to clearly record the data information and the form information, it is necessary to insert the data between the lines of the form. For this purpose, the timing of production of the data video signal is set in advance with respect to the form video signal read out of the optical detector 23. For instance, the scanning line forming data may not coincide with the scanning line corresponding to a horizontal line of the form. In this case, the generation of the latter scanning line is set with the count value of the scanning line counter 35.

If the galvanometer mirror 11 is shifted even slightly in its deflection direction because of drift during operation, the scanning line for reading the horizontal line of the form is correspondingly shifted. Therefore, during the recording operation, it may occur that the scanning line corresponding to the video signal forming the horizontal line of the form may coincide with the scanning line bearing the data video signal. As a result, the recorded picture is poor in appearance because the data overlaps with the horizontal line.

Figure 2:
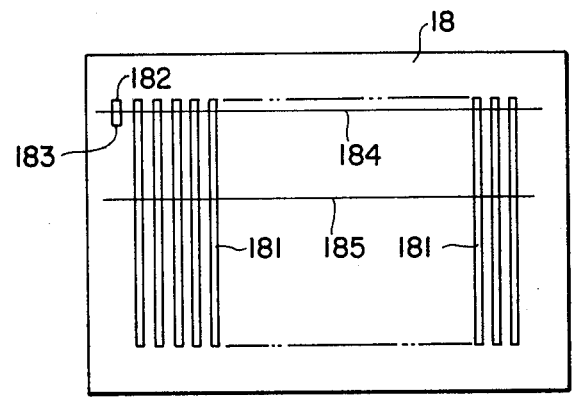
FIG. 2 is a plan view of one example of a linear encoder employed with the invention.

To correct for this, a drift detection circuit is provided which is one of the unique features of the invention. A system for producing a video signal corrected by utilizing the drift detection will be described. The linear encoder 18, which is also one of the unique features of the invention, will be described with reference primarily to FIG. 2 which is a plan view of the transparent and the opaque parts of the linear encoder 18. The linear encoder 18 is produced by forming belt-shaped transparent parts 181 in an opaque board at constant intervals. The length in the horizontal deflection direction of the stripe-like region formed by the transparent parts 181 is slightly shorter than the deflection length of the reading laser beam 6 deflected by the rotary multi-mirror 8 while the length in the vertical direction is slightly longer than the deflection length of the reading laser beam 6 deflected by the galvanometer mirror 11. That is, in FIG. 2, the raster formed by the reading laser beam 6 is longer in the horizontal direction and shorter in the vertical direction than the stripe-like region. In FIG. 2, the locus of the optical spot of the reading laser beam 6 forms a scanning line from the upper left to the upper right. The scanning line is moved downwardly thus forming the raster.

The linear encoder 18 has a transparent part 182 in the upper left portion thereof. The vertical length of the transparent part 182 is shorter than those of the other transparent parts 181 and the lower end of the transparent part 182 has sharp edge 183. The number of photo-electric pulse signals generated A corresponding to the scanning line 184 passing through the transparent part 182 is larger by one than the number of photo-electric pulse signals A corresponding to the scanning line 185 which does not pass through the transparent part 182.

The photo-electric pulse signal A is applied from the optical detector 21 to a counter 31 where it is counted and to a retriggerable multivibrator 32. The multivibrator 32 for instance be a SN74123 integrated circuit made by Texas Instrument Co. with the time constant thereof so set as to be longer than the period of the photo-electric pulse signal A. The output signal B of the multivibrator 32 is set to a low logic level after the previous horizontal scanning has been completed and the output signal B is raised to a high logic level when the multivibrator 32 is triggered by the first photo-electric pulse signal A in the following horizontal scanning. The output signal B is applied to the counter 31. Therefore, the counter 31 is reset when the output signal B is at the low logic level. The counter 31 counts the photo-electric pulse signals A for every scanning line. In the case where the scanning line passes through the transparent part 182, the counter 31 applies the "galva-up" signal D to a scanning line counter 35 and a mark signal C to a mark counter 33. In the case where the scanning line passes through the transparent parts 181 only without passing through the transparent part 182, only the "galva-up" signal is applied to the scanning line counter 35. That is, the "galva-up" signal D is produced when the photo-electric pulse signals A are as many in number as the transparent parts 181 while the mark signal C is produced when the photo-electric pulse signals A number more by one pulse than the number of the transparent parts 181.

Figure 3A:
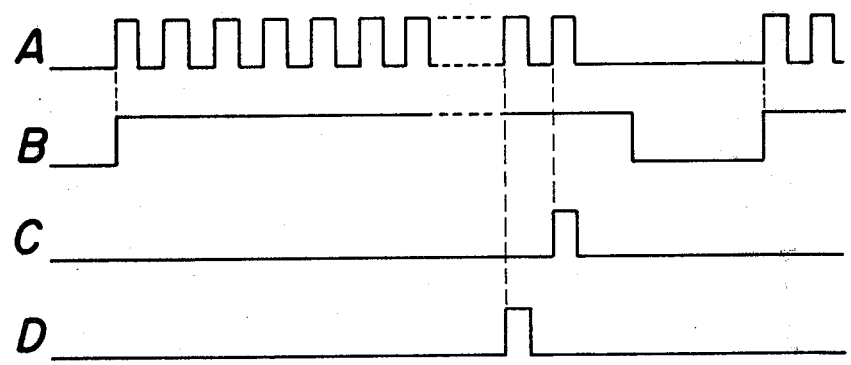
FIGS. 3a and b are timing diagrams indicating the relation between a photo-electric pulse signal from the linear encoder and a mark signal.
Figure 3B:
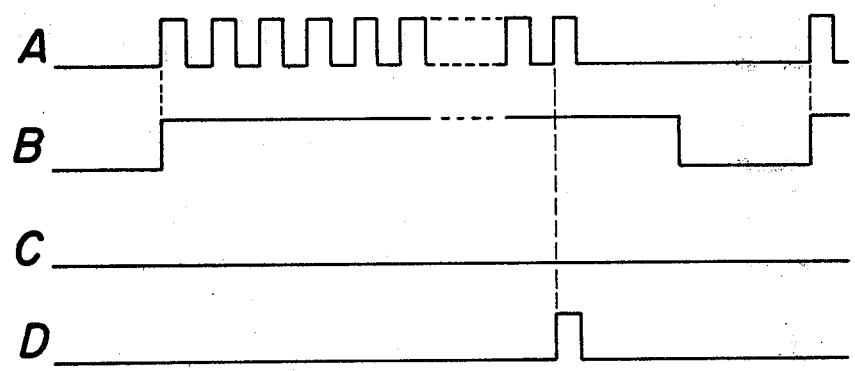

The relation between the signals A, B and C is as indicated in FIGS. 3a and 3b. In FIGS. 3a and 3b, the horizontal axis is the time axis and the vertical axis indicates the magnitudes of the electrical signals. In the case of the scanning line 184, the signals C and D are as indicated in FIG. 3a. In the case of the scanning line 185, only the signal D is produced as indicated in FIG. 3b.

The length in the vertical deflection direction of the additional transparent part 182 in the linear encoder 18 is determined from the operating temperature range of the laser recording device and corresponds, for instance, to about thirty scanning lines. The position of the galvanometer mirror 11 when the scanning line counter 35 is reset to zero is set to the position of the scanning line passing through substantially the center of the transparent part 182, that is the position of the scanning line which is about fifteen scanning lines above the edge 183 of the transparent part 182. Furthermore, the position of the first scanning line bearing the data video signal is set to the position of the scanning line which is eight scanning lines below the edge 183. In this case, the scanning line for recording is generated when the count value of the scanning line counter 35 reaches twenty-three (23 = 15 + 8). Therefore, the recording speed can be increased if the recording operation is started with the initial value of the scanning line counter 35 set to twenty-three instead of clearing the content of the scanning line counter 35.

The shift in position of the scanning lines relative to linear encoder 18 due to the above-mentioned shift in the raster scan pattern can be corrected as follows. The mark signals C are counted, for instance, during the recording material shifting period between frame recording periods whenever a suitable number of frames have been recorded whereby the shift in position of the scanning lines is stored as a number of scanning lines and the timing of the data video signal is shifted in accordance with this number of scanning lines. In other words, after a certain number of frames have been recorded, the scanning line counter 35 is reset to zero and the mark signals C are counted. For this operation, the optical modulator 3 is so set as to turn off the laser beam 2. The value thus counted corresponds to the number of scanning lines which pass through the transparent part 182. A value obtained by adding the aforementioned numerical value eight to this value is stored so as to be employed as the initial value of the scanning line counter 35 for the following operation. This will be described with reference to FIG. 1. The mark signals C produced by the scanning line counter 31 are counted by the mark counter 31 and the resultant count value is added to the numerical value eight applied to the other input 38 of the adder 34. The output of the adder 34 is applied as an initial value to the scanning line counter 35. The following recording operation is started with this initial value for the first scanning line for every frame.

The variations in the initial deflection angle of the galvanometer mirror 11 depend on temperature so that therefore such variations will not abruptly occur. Accordingly, the above-described operation for correction detection need only be carried out every ten frames for example. This can be done by detecting the number of recorded frames with a suitable counter.

In the above-described embodiment, the correction operation can be carried out utilizing about forty scanning lines corresponding to the size of the transparent part 182. Therefore, the time required for the correction operation is quite short and, accordingly, the correction operation only very slightly decreases the recording speed. Thus, the displacement of the data and form due to a shift in position of the scanning lines can be corrected and a clear accurately aligned record can be provided at all times.

In the above-described embodiment, the configuration of the linear encoder is such that the short transparent part 182 is provided in the upper left portion of the encoder. However, the same effect can be obtained by providing the short transparent part 182 in the upper right portion. The transparent part 182 may be provided below the edge 183 in such a manner that the transparent part 182 extends to the lower edge of the transparent part 181 or somewhat shorter. In this case, the number of photo-electric pulse signals A corresponding to the mark signal C is less by one pulse than that corresponding to the "galva-up" signal D.

In the above-described embodiment, in repeating the recording operation, the initial value of the scanning counter 35 is set and is suitably corrected. However, the scanning line counter 35 may be set to zero whenever the recording operation is repeated. In the latter case, the recording operation can be started, for instance, with the eighth scanning line from the edge 183 and therefore the recording operation can be started with the eighth scanning line after generation of the mark signal C is suspended. The length, in the vertical deflection of the transparent part 182, that is, the position of the edge 183, the number of the scanning line below the edge 183, or the position of the scanning line obtained when the scanning line counter 35 is set to zero can be suitably determined depending to the laser recording device being used.

What is claimed is:

1. A light beam recording system for carrying out a recording operation on a recording material by modulating a recording light beam, in which (i) a reading light beam and said recording light beam are deflected by the same two-dimensional optical deflection system, (ii) a form is subjected to raster scanning with a part of said reading light beam to provide a form signal while a linear encoder is subjected to raster scanning with a part of said reading light beam to provide a video clock signal, and (iii) said recording material is subjected to raster scanning with a video signal which is produced by combining a data signal and said form signal by means of said video clock signal, the improvement comprising means for detecting the drift of vertical deflection means in said two-dimensional optical deflection system from a number of scanning lines by vertically scanning said linear encoder, and means for correcting timing of generation of said data signal in accordance with the amount of drift thus detected.

2. A light beam recording system comprising:
means for producing a reading light beam;
means for producing a recording light beam;
means for combining said reading and recording light beams;
means for deflecting the combined light beams in two mutually perpendicular directions to form a raster pattern;
means disposed following said deflecting means for separating the combined beams;
means for dividing the separated reading beam into two portions, one of said portions being shone upon a linear encoder and the other of said portions being shone upon a form having line patterns;
means for producing a first electrical signal in response to light shone upon said linear encoder;
means for producing a second electrical signal in response to light shone upon said form;
means for producing a third electrical signal representing an amount of drift of said reading beam in response to said first electrical signal;
a source of clock pulse signals;
a data signal source, data being read out of said data signal source in response to said clock pulse signals;
means for varying the time position of pulses of said clock pulse signal in response to said third electrical signal;
means for combining said data signal and said second electrical signal; and
means for modulating said recording beam in response to the combined data and second electrical signals.

3. A light beam recording system comprising:
means for producing a reading light beam;
means for producing a recording light beam;
means for combining said reading and recording light beams;
means for deflecting the combined light beams in two mutually perpendicular directions to form a raster pattern;
means disposed following said deflecting means for separating the combined beams;
means for dividing the separated reading beam into two portions, one of said portions being shone upon a linear encoder and the other of said portions being shone upon a form having line patterns;
means for producing a first electrical signal in response to light shone upon said linear encoder;
means for producing a second electrical signal in response to light shone upon said form;
means for producing a third electrical signal representing an amount of drift of said reading beam in response to said first electrical signal;
a source of clock pulse signals;
a data signal source, data being read out of said data signal source in response to said clock pulse signals;
means for varying the angular position of said means for deflecting in response to said third electrical signal;
means for combining said data signal and said second electrical signal; and
means for modulating said recording beam in response to the combined data and second electrical signals.

4. The light beam recording system of claim 2 or 3 wherein said means for producing a reading light beam and said means for producing a recording light beam comprise laser light sources having different wavelengths.

5. The light beam recording system of claim 4 wherein said deflecting means comprises:
a rotating multi-faced mirror; and
a galvanometer-driven mirror.

6. The light beam recording system of claim 2 or 3 wherein said linear encoder comprises:
- a plurality of alternating transparent and opaque regions; and
- a transparent region shorter than said first-mentioned transparent regions disposed on one side of said first-mentioned transparent regions.

7. A light beam recording system for carrying out a recording operation on a recording material by modulating a recording light beam in which (i) a reading light beam and said recording light beam are deflected by the same two-dimensional optical deflection system, (ii) a form is subjected to raster scanning with a part of said reading light beam to provide a form signal while a linear encoder is subjected to raster scanning with a part of said reading light beam to provide a video clock signal, and (iii) said recording material is subjected to raster scanning with a video signal which is produced by combining a data signal and said form signal by means of said video clock signal by means of said video signal, the improvement comprising means for detecting the drift of vertical deflection means in said two-dimensional optical deflection system from a number of scanning lines by vertically scanning said linear encoder, and means for correcting the angular position of said vertical deflection means in accordance with the amount of drift thus detected.

* * * * *